US006833174B2

(12) United States Patent
Schuren et al.

(10) Patent No.: US 6,833,174 B2
(45) Date of Patent: Dec. 21, 2004

(54) MOLDED SHEET, ITS USE, AND PROCESS FOR ITS PRODUCTION

(75) Inventors: Geer Schuren, Heel (NL); Robert Huusken, Nederweert (NL)

(73) Assignee: Trespa International B.V., Weert (NL)

( * ) Notice: Subject to any disclaimer, the term of this patent is extended or adjusted under 35 U.S.C. 154(b) by 0 days.

(21) Appl. No.: 10/013,625

(22) Filed: Dec. 11, 2001

(65) Prior Publication Data

US 2002/0150749 A1 Oct. 17, 2002

(30) Foreign Application Priority Data

Dec. 23, 2000 (DE) ........................................ 100 64 890

(51) Int. Cl.[7] .................................................. B32B 3/10

(52) U.S. Cl. ......................... 428/137; 264/10; 264/402; 264/425; 264/454; 264/459; 264/480; 428/142; 428/220; 428/156; 428/172; 428/174; 428/187; 428/212; 428/195.1; 428/213; 428/215; 428/219

(58) Field of Search ................................ 428/137, 142, 428/156, 172, 174, 187, 195.1, 212, 213, 215, 219, 220, 195; 264/10, 402, 425, 454, 459, 480

(56) References Cited

U.S. PATENT DOCUMENTS

| | | | | |
|---|---|---|---|---|
| 3,849,368 A | | 11/1974 | Anderson et al. | 260/45.8 |
| 4,085,247 A | * | 4/1978 | Godfried | |
| 4,345,059 A | * | 8/1982 | Fretz et al. | 528/102 |
| 4,440,944 A | * | 4/1984 | Fretz et al. | 560/76 |
| 4,503,115 A | * | 3/1985 | Hemels et al. | |
| 6,031,032 A | * | 2/2000 | Horacek et al. | 524/100 |

FOREIGN PATENT DOCUMENTS

| | | |
|---|---|---|
| EP | B 0 081 147 | 11/1982 |
| WO | WO 96/09344 | 3/1996 |
| WO | WO 99/45061 | 9/1999 |

* cited by examiner

*Primary Examiner*—Merrick Dixon
(74) *Attorney, Agent, or Firm*—Roberts & Roberts, LLP

(57) ABSTRACT

A molded sheet has a core which is composed of a number of core layers and, located on both sides of the core, substrate layers, decorative layers, and clear layers. Flame retardants have been added to the various layers of the molding, and specifically in a manner such that the distribution of the flame retardants is non-uniform across the thickness of the molding, and the distribution here may be selected to be symmetrical or asymmetrical with respect to the center of the thickness of the molding.

32 Claims, 2 Drawing Sheets

Symmetrical flame retardant distribution

Symmetrical flame retardant distribution

MOLDED SHEET, ITS USE, AND PROCESS FOR ITS PRODUCTION

BACKGROUND OF THE INVENTION

1. Field of the Invention

The invention relates to a molded sheet with a core made from a number of core layers and, located on one or both sides of the core, substrate layers, decorative layers, and clear layers, where flame retardants have been added to the molding, and to a use of the molding, and to a process for its production.

2. Description of the Related Art

For the purposes of the present invention, "a molded sheet" means either flat sheets or else moldings which have been produced in a mold and are not flat, these having thickened face edges, for example, or a profile with different thicknesses along the length of the format.

Sheets of this type are generally composed of a number of thermoset-binder-impregnated supportive plies, which are molded in a press using increased pressure and temperature to give a sheet or a molding, by virtue of curing of the binder. These sheets and/or moldings are used either for the fitting-out of interiors or else for external applications, and have to comply with certain fire standards. For the fitting-out of interiors, the moldings are used in the office, kitchen, bathroom, laboratory equipment, furniture, etc., and an example of their use in an external application is as cladding. In order to comply with the fire standards, it is usual in the prior art to add flame-retardant additives, known as flame retardants, to the moldings.

Moldings of sheet type usually have a layer-like structure and are composed of a substrate core which has two or more layers and has been laminated, on one side or on each side, to a substrate layer, a decorative layer, and a clear layer. The decorative layers are generally papers which comprise α-cellulose and which have been colored, pigmented, printed on, or provided with a decorative effect, and which have been converted into a decorative premolding by virtue of saturation and drying, using a low-molecular-weight melamine resin. Each individual decorative layer may comprise a second layer which has been applied to the outer side of the decorative layer and is produced from a paper which comprises α-cellulose and has been impregnated with a low-molecular-weight melamine resin but has not been printed and comprises no decorative element. This is what is known as a clear layer, which has the properties of the premolding. It is usual for there to be no flame retardants present in the decorative layers and clear layers. The core is composed of a number of layers, generally composed of a paper which comprises α-cellulose (kraft paper), and which are laminated to one another to give the core, by virtue of saturation with a low-molecular-weight phenolic resin followed by drying. This layer has usually been treated with a flame retardant.

EP-B 0 081 147 describes a decorative panel suitable for external applications and composed of a pressed core made from fibers surrounded by heat-cured phenol-formaldehyde resin, and which has a decorative layer on one or both surfaces of the core. The core is composed of wood fibers and/or cellulose fibers, which have been coated with a heat-curable phenol-formaldehyde resin in aqueous solution or dispersion. The method of producing one embodiment of this panel is that one or more mutually superimposed, mechanically precompacted layers based on wood particles, impregnated with the heat-curable phenol-formaldehyde resin, are laminated with heat to form the core of the panel, thus curing the synthetic resin.

Hot-laminated decorative high-pressure laminates (HPLs) of this type are what are known as compact moldings, the structure of which is either identical with or similar to that of compact sheets in accordance with EN 438-1, ISO 4586, or DIN 16926.

WO 99/45061 describes composite materials which are composed of a fibrous and/or woven material, impregnated and hardened with a resin matrix. The resin matrix based on an epoxide/anhydride reactive resin has been rendered flame-retardant using reactively incorporated phosphorus compounds based on acid derivatives. The flame-retardant composite material also comprises fillers, defoamers, flow auxiliaries, adhesion promoters, and reaction accelerators commonly used in epoxy resin chemistry, e.g. tertiary amine and/or imidazole, and organometallic complexes. The phosphorus content, based on the resin matrix, is from 0.5 to 5% by weight. Composite materials of this type are used as lightweight materials in vehicle construction, for rail vehicles, bodywork of motor vehicles, and components of ships or of aircraft.

It is also known that flame-retardant additives can be used in plastics. For example, WO 96/09344 describes a flame-retardant, glass-fiber-reinforced polyamide resin composition which comprises from 10 to 40% by weight of melamine phosphate, melamine pyrophosphate, in particular dimelamine pyrophosphate or melamine polyphosphate, or else a mixture of these. Other preferred halogen-free flame retardants which may be present in the polyamide resin composition are zinc borate, zinc phosphate, melamine sulfate, and ammonium polyphosphate. Conventional additives, such as lubricants, dispersing agents and adhesion promoters, may also be added, examples of these being stearates, phosphonates, fatty acid amides, and Aerosils. Glass-fiber-reinforced polyamide resin compositions of this type are particularly suitable for producing moldings which are used in the electrical or electronics industry.

The cores of known sheets comprise resins selected from the group consisting of amino plastics, epoxy plastics, urethane plastics, thermosets, and mixtures of these. Flame retardants are generally added to these resins. Flame retardants used are phosphorus-containing additives or additives with phosphorus-nitrogen. Other known flame retardants are borates or hydroxides of aluminum, zinc or magnesium, and halogen-containing organic compounds. If the core is composed of a prefabricated premolding made from wood fibers and/or from cellulose fibers, the flame retardant may be added to the binder for the wood fibers or cellulose fibers. Besides this, there is also the possibility of adding the flame retardant directly to the wood fibers or wood flour used to mold the premoldings. In the known sheets which comprise a flame retardant there is always uniform distribution of the flame retardant, both in the core layer and in the decorative layers, in the event that these have also been provided with a flame retardant. Decorative layers of this type are composed, for example, of a crosslinked acrylic, urethane, epoxy, or melamine resin which has been modified using acrylic resin and comprises fillers and/or colorants. In each case, a flame retardant is then added to these resins.

In the event that a molding is heated to the ignition temperature, the decorative layer first begins to burn, followed by the core layers situated thereunder, until the entire molding burns. To prevent fire it is important that the moldings do not ignite in the event of a fire, since the ignition of the moldings accelerates the heating process, therefore generating more heat which again accelerates the heating process. This upward spiral of phenomena has a very substantial effect on the fire performance of the moldings and their classification under standards.

It is an object of the invention to improve the flame retardancy of moldings of the type described at the outset in such a way as to increase the effectiveness of the flame retardants present in the moldings. This object is achieved in that the distribution of the flame retardants is non-uniform across the thickness of the molding.

SUMMARY OF THE INVENTION

The invention provides a sheet molding with a core made from a number of core layers, and, located on one or both sides of the core, substrate layers, decorative layers, and clear layers, where flame retardants have been added to the molding, wherein the distribution of the flame retardants across the thickness of the molding is non-uniform.

The invention also provides a process for producing a sheet molding which comprises inserting a release layer, a clear layer, a decorative layer and/or a substrate layer, where the decorative layer is modified with an amount $m_1$ of a flame retardant and the substrate layer is modified with an amount $m_2 \leqq m_1$ of a flame retardant, and a prefabricated core composed of a number of core layers, where each core layer has been modified with a similarly large amount $m_3$ of a flame retardant, where $m_3 \leqq m_2 \leqq m_1$, and inserting another substrate layer and/or a decorative layer, each of which has been provided with a flame retardant, and a clear layer, and a release layer, into an open press, and hot pressing, under pressure, all of the layers present in the press, whereupon the prefabricated layers are cured, the resins of the layers liquefy, and the layers are molded to give a massive homogeneous molding.

The invention further provides a sheet molding which comprises:

a) at least one core layer, which core has a front surface and a rear surface;

b) a front substrate layer attached to the front surface of the core, and a rear substrate layer attached to the rear surface of the core;

c) a front decorative layer attached to the front substrate layer, and a rear decorative layer attached to the rear substrate layer; and d) a front clear layer attached to the decorative layer, and a rear clear layer attached to the rear decorative layer;

wherein at least one flame retardant material is present in at least one of the layers, and wherein the distribution of the flame retardant across the thickness of the molding is non-uniform.

The invention still further provides a process for producing a sheet molding which process comprises:

a) providing an open heat press;

b) inserting a plurality of pre-molding layers into the open press, which pre-molding layers comprise, in order, a front release layer, a front clear layer, a front decorative layer, a front substrate layer, a prefabricated core comprising at least one core layer, a rear substrate layer, a rear decorative layer, a rear clear layer, and a rear release layer, wherein the front decorative layer comprises an amount $m_1$ of a flame retardant, the front substrate layer comprises an amount $m_2$ of a flame retardant, wherein $m_2 \leqq m_1$, and wherein each core layer comprises an amount $m_3$ of a flame retardant, wherein $m_3 \leqq m_2 \leqq m_1$, and wherein the rear substrate layer and the rear decorative layer each comprises a flame retardant material;

b) hot pressing, under pressure, all of the pre-molding layers present in the press, such that the prefabricated core becomes cured, any resins of the pre-molding layers liquefy, and the pre-molding layers are molded to the core to thereby form a sheet molding.

DETAILED DESCRIPTION OF THE PREFERRED EMBODIMENT

Figure 1:
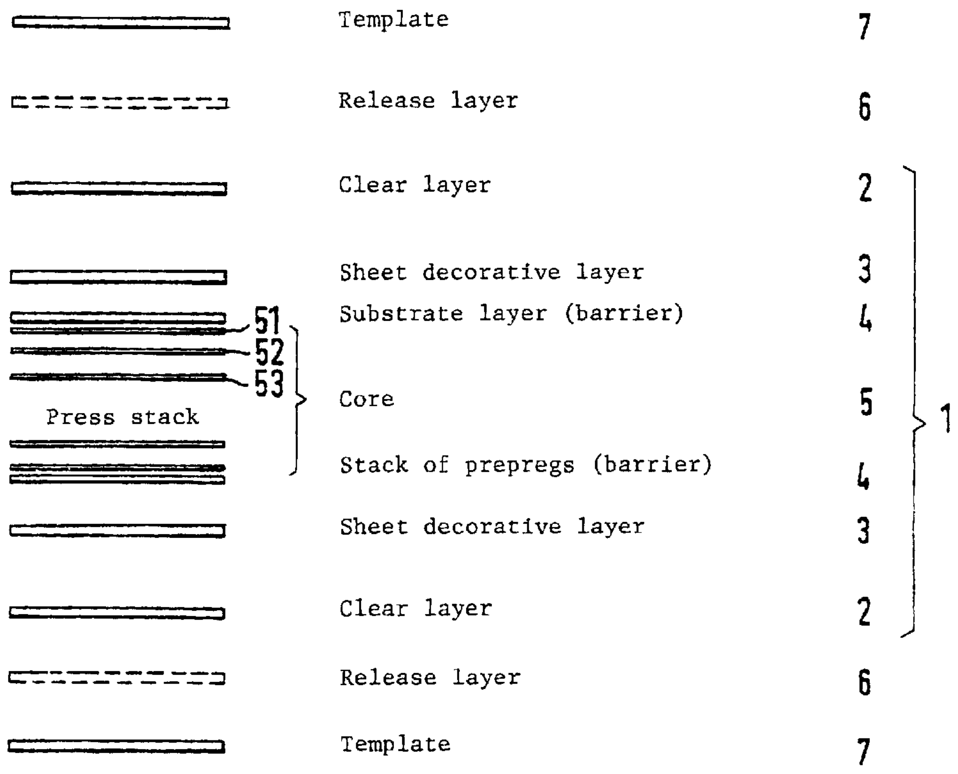
FIG. 1 shows a diagram of the structure of a molding made from individual layers inserted mutually superposed into a press.

FIG. 1 is a diagram of the structure of a molding 1 which is composed of a core 5, each of whose sides has been enclosed by a substrate layer 4, a decorative layer 3, and a clear layer 2. The core 5 is composed of what is known as a premolding, i.e. of a prepreg made from individual core layers 51, 52, 53. The latter numeral in the reference numbers designating the core layers gives the serial numbering of these core layers. The substrate layers 4, 4 serve as barrier layers for the core, and may be omitted in certain examples. The decorative layers 3, 3 are preferably composed of a coating layer, and have a weight per unit surface area of from 10 to 400 g/m$^2$, in particular from 50 to 250 g/m$^2$. They are composed of a crosslinked acrylic, urethane, epoxy, or melamine resin, and the acrylic resin here may have been pigmented, and may comprise fillers and/or colorants. The clear layers 2, 2 serve mainly as layers protecting the surface of the molding from damage. The decorative layers 3, 3 may be composed of decorative papers resinified using melamine. According to the invention, flame-retardant additives, known as flame retardants, are added to each of the decorative layers 3, 3, the substrate layers 4, 4, and the core layers 51, 52, 53. If the decorative layers 3, 3 are melamine-resin-impregnated decorative papers, no flame retardants are generally present in these.

FIG. 1 is a diagram of the insertion of the various layers into an open press, between the upper and lower templates 7, 7 of which the individual layers are inserted. The release layers 6, 6 serve mainly to prevent adhesion of the molding 1 to the template 7, 7 once the press procedure has ended. The individual layers are inserted into the open press as follows: the release layer 6, the reverse-side clear layer 2, the reverse-side decorative layer 3, the substrate layer 4, the core 5, another substrate layer 4, a frontal decorative layer 3, a frontal clear layer 2, and also a release layer 6, are laid in succession onto the lower template 7. The press is then closed, and the hot-lamination of the layers to give the molding 1 takes place under pressure and with heat. The temperature during this process is from 120 to 180° C., and the pressure is from 60 to 110 bar.

The core 5 has been formed as a premolding (prepreg) from the core layers 51, 52, 53, and is prefabricated by the process described in EP-B 0 081 147 for example from layers composed of wood particles and/or of cellulose fiber particles. The manner in which this takes place is that two or more mutually superposed, mechanically precompacted layers based on wood particles and/or on cellulose fiber particles, impregnated with the heat-curable synthetic resin selected from the group consisting of the amino plastics, epoxy plastics, urethane plastics, thermosets, and mixtures of these are laminated with heat to form the core of the panel, thus curing the synthetic resin. The flame retardants are generally added to these resins and are selected from the group consisting of phosphorus-containing or phosphorus-nitrogen-containing additives, halogen-containing organic compounds and nitrogen-containing compounds, borates, and hydroxides. These borates and hydroxides are those of aluminum, zinc, or magnesium. The flame retardants are in particular selected from the group consisting of melamine polyphosphates, melamine pyrophosphates, ammonium polyphosphates, ammonium (pyro)phosphates, amine (pyro) phosphates. The inorganic flame retardants also include antimony oxide. The phosphorus-containing flame retardants are the most effective and their use is therefore also preferred.

Figure 2:
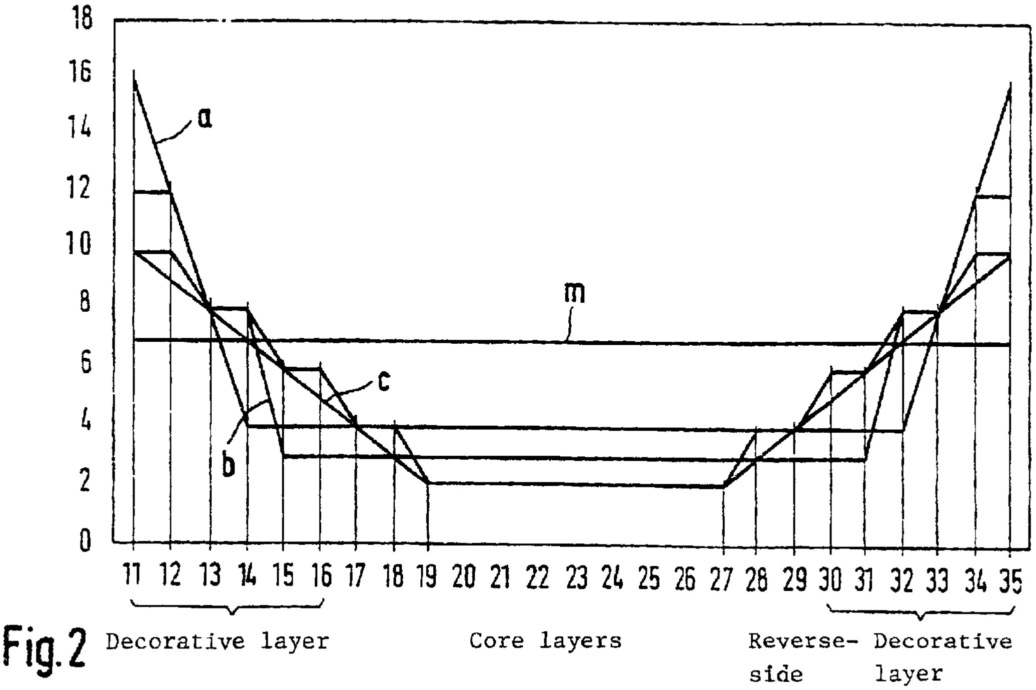
FIG. 2 shows a chart of various symmetrical distributions of the flame retardants across the thickness of moldings, each of whose cores has a different number of core layers.
Figure 3:
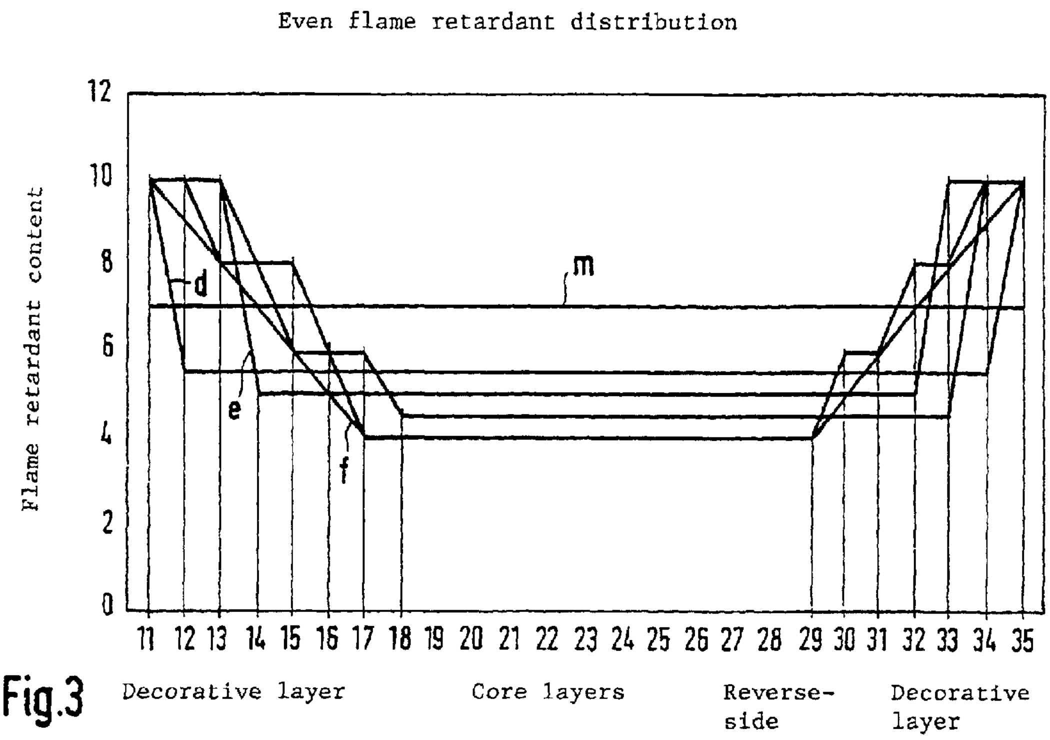
FIG. 3 shows a chart of various symmetrical distributions of flame retardants similar to those of FIG. 2, the distributions near to the surfaces of the moldings being flatter than in FIG. 2.
Figure 4:
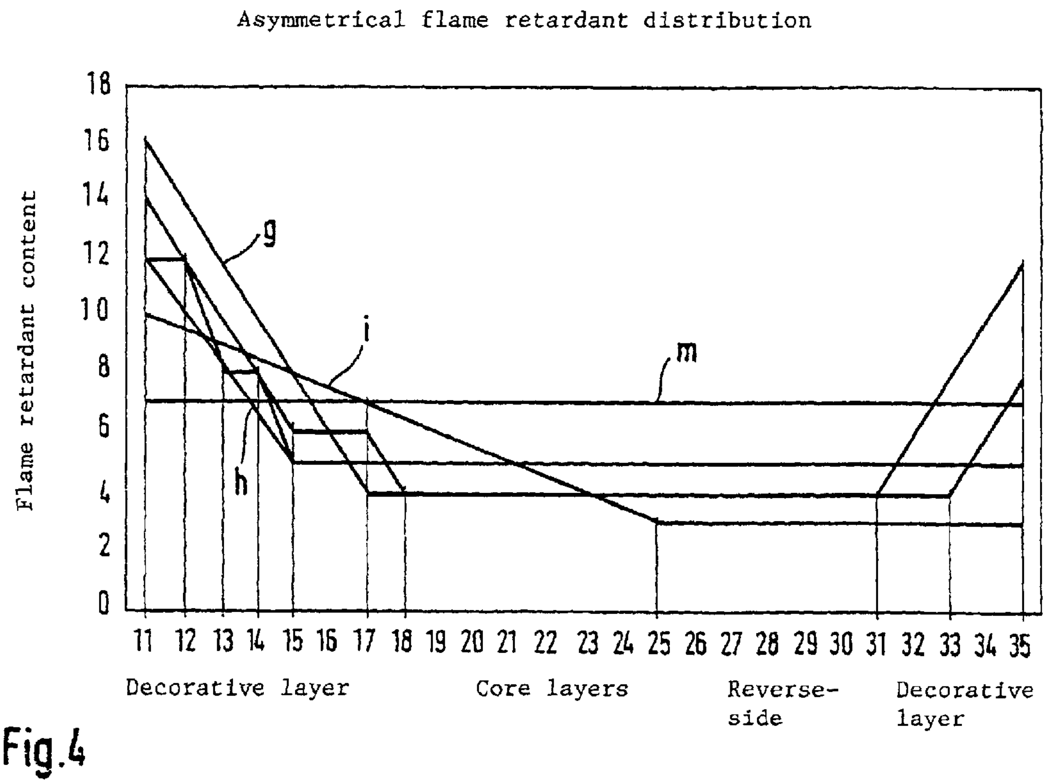
FIG. 4 shows a chart of various asymmetrical distributions of flame retardants across the thickness of moldings, each of whose cores has a different number of core layers.

The X axis in FIGS. 2 to 4 has serial item numbers 11 to 35 corresponding to the various layers of the molding. The item numbers 11 to 16, for example, encompass the frontal decorative layer, the item number 16 denoting the boundary with the core 5, corresponding to the item numbers 17 to 29, for example. The item numbers 30 to 35 relate to the reverse-side decorative layer 3 of the molding 1. Since the core 5 has generally also been encapsulated by a frontal and a reverse-side substrate layer 4, 4 the item numbers 17, 18 and 19 and, respectively, 27, 28, and 29 may, for example, correspond to substrate layers of this type.

The active content of flame retardant in percent by weight, in each case based on the weight of the respective layer, has been plotted on the Y axis. The active content of phosphorus or of a halogen in the flame retardant may also have been plotted on the Y axis, instead of the active content of flame retardant. The center of the thickness of the molding 1 is given by the item number 23. The profiles or the flame retardant distribution are formed symmetrically or asymmetrically with respect to an imaginary line drawn through the item number 23. In each of FIGS. 2 to 4, the straight line m indicates the prior art in which the flame retardant distribution is uniform, i.e. all of the layers modified with flame retardant comprise the same amount of flame retardants. Each flame retardant here may be the same, or the flame retardants in the layers may be different if it has been ensured that the amount of phosphorus actively engaged in fire protection is the same in all of the layers.

FIG. 2 shows three symmetrical profiles a, b, c, or flame retardant distributions which have flanks of different steepness. The profiles a and b have the steeper flanks, the amount of flame retardant in the two outer items 11 and 35 amounting to 16% by weight, and that in items 14 to 32 amounting to 4% by weight. The steepness of the flanks in profile b is similar to that in profile a, the amount of flame retardant in items 14 and 32 being 8% by weight, and that in items 15 to 31 being 3% by weight. The flanks in profile c are flatter than in profiles a and b, the amount of flame retardant in the outer items 11 and 35 being 10% by weight, and the amount of flame retardant in items 19 to 27 being 2% by weight.

From FIG. 2 it can be clearly seen that in the profiles a, b and c the total amount of flame retardant is smaller than for the uniform distribution of flame retardant known from the prior art and given by the straight line m in FIG. 2. Compared with the known uniform distribution of flame retardant, it has been found that a saving of from 10 to 25% by weight of flame retardant can be achieved by distributing the amounts of the flame retardant across the thickness of the molding 1. Despite the smaller amount of flame retardant used, the fire performance of a molding 1 prepared in this way is just as good as the fire performance of an appropriate molding with uniform flame retardant distribution. The ratio selected for the amount of flame retardant in the center of the core 5 to that in the decorative layer and/or substrate layer is 1: from 1.5 to 6, in particular 1: from 2.0 to 3.5, depending on the fire performance desired. If the same amounts of flame retardant are used in a molding with uniform flame retardant distribution and in a molding 1 of the invention with symmetrical or asymmetrical flame retardant distribution, the molding 1 of the invention exhibits improved fire performance compared with the molding with uniform flame retardant distribution.

FIG. 3 shows profiles d, e, f, which give a symmetrical distribution of flame retardant and are flatter than in the specimens of FIG. 2. The flanks of the profiles d and e exhibit similar steepness, and are steeper than the flanks of profile f. The amount of flame retardant in items 11 and 35 of profile d is 10% by weight and falls to a value just below 6% by weight in the region from item 12 to item 34. Profile e has an amount of 10% by weight of flame retardant in items 13 and 33 and an amount of 5% by weight of flame retardant in items 14 to 32. The amount of the flame retardant in items 11 and 35 of profile f is 10% by weight, and it is 4% by weight in the range from items 17 to 29.

FIG. 4 is a diagram of three profiles g, h, i with asymmetrical distribution of flame retardant in relation to an imaginary line through item 23. The amount of flame retardant in items 11 and 35 of profile g is 16% by weight and 8% by weight, respectively. The amount of the flame retardant in the region from items 17 to 33 is 4% by weight. Profile h has an amount of 12% by weight of flame retardant in item 11 and an amount of 5% by weight of the flame retardant in the range from item 15 to 35. In profile i the amount of flame retardant is 10% by weight in item 11, and 3% by weight in the region from item 25 to 35.

The effectiveness of the flame retardant in the molding 1 depends not only on the amount of flame retardant used for modifying the various layers of the molding 1 but also on the nature of the flame retardant. Since moldings have various application sectors, they have to comply with various requirements for fire performance and for their physical and mechanical properties. Fire performance here is measured to ISO 5660 (Cone Calorimeter) weathering resistance by means of the Xenon test 1200, water absorption and swelling in boiling water to the standard EN 438-2 and in water at a temperature of 23° C. to DIN 53495 Method 3L, and modulus of elasticity is tested to DIN 53457, and flexural strength to ISO 178.

Examples of the flame retardants are those selected from the class consisting of melamine polyphosphate, melamine pyrophosphate, ammonium polyphosphate, ammonium (pyro)phosphate, amine (pyro)phosphate, halogenated organic compounds, borates or hydroxides of aluminium, zinc, or magnesium, and antimony oxide. Phosphorus- and phosphorus-nitrogen-containing flame retardants are particularly suitable for moldings whose core comprises cellulose. Flame retardants based on halogenated organic compounds have only limited weathering resistance and are therefore suitable only for interior application and core-modification of the molding. They are not entirely environmentally compatible, due to release of halogens in the event of fire. When inorganic flame retardants are used, for example borates or hydroxides based on aluminum or magnesium, relatively high concentrations are required for effective flame retardancy, and this then impairs the mechanical properties and the water absorption of the molding. Flame retardants generally preferred are phosphorus- and phosphorus-nitrogen-containing flame retardants. The procedure for setting the concentrations or the amounts of flame retardant in the core layers, and also in the substrate layers associated with these and provided as fire-barrier layers, and in the decorative layers, is to use highly effective flame retardants for the decorative layers, for example melamine polyphosphate or melamine pyrophosphate or ammonium polyphosphates, these being flame-retardant even at relatively low temperature. Use may then be made of less effective flame retardants in the core, for example ammonium (pyro)phosphate, amine (pyro)phosphate, and the ammonia or amine in these may have either ionogenic or covalent bonding. As mentioned above, substrate layers may be integrated as barrier layers in the core, the substrate layers advantageously being laminated to both sides of the core.

The individual layers of the molding here comprise different amounts of flame retardant. In an embodiment of the invention, the amounts of flame retardants in the layers at the surfaces of the molding are greater than those in the layers of the core. It is advantageous here for the distribution of the flame retardants across the thickness of the molding to be symmetrical, the flame retardant content in the core layers being lower than in the decorative and substrate layers.

In an embodiment of the invention, the same flame retardant is added to the layers provided with flame retardancy in the molding.

In another embodiment of the invention, the distribution of the flame retardants across the thickness of the molding is asymmetrical, the amount of flame retardant in the frontal decorative layer being greater than in the reverse-side decorative layer, and the amount of flame retardant in the core layers being smaller than in each of the two decorative layers. It is also possible for individual layers of the molding to comprise different flame retardants.

An advantage achieved by the invention is that, compared with uniform distribution of the flame retardants in the known moldings, smaller amounts of flame retardants are used to achieve the same level of flame retardancy or that the same amount of flame retardant is used to achieve increased flame retardancy.

The scope of the invention is also intended to include a process which produces a molding shaped as a sheet and which permits non-uniform distribution of the flame retardants in the individual layers, across the thickness of the molding. This is achieved by inserting a release layer, a clear layer, a decorative layer and/or a substrate layer, where the decorative layer is modified with an amount $m_1$ of a flame retardant and the substrate layer is modified with an amount $m_2 \leqq m_1$ of a flame retardant, and a prefabricated core composed of a number of core layers, where each core layer has been modified with a similarly large amount $m_3 \leqq m_2$ of a flame retardant, and inserting a substrate layer and/or a decorative layer, each of which has been provided with a flame retardant, and a clear layer, and a release layer, into an open press, and hot pressing, under pressure, all of the layers present in the press, whereupon the prefabricated layers are cured, the resins of the layers liquify, and the layers are molded to give a massive homogeneous molding.

In an embodiment of the process, the other decorative layer and/or substrate layer is provided with an amount $m_1$ and, respectively, $m_2$ of the flame retardant, where $m_3 \leqq m_2 \leqq m_1$. In another embodiment of the process, the other decorative layer and/or substrate layer is modified with an amount $m_4$ and, respectively, $m_5$ of flame retardant, where $m_3 \leqq m_5 \leqq m_4$ and $m_5 < m_2$ and $m_4 < m_1$.

The process permits each of the decorative layers, substrate layers, and core layers to be modified with the same flame retardant. It is also possible for each of the decorative layers, substrate layers, and core layers to be provided with a different flame retardant.

Advantages achieved by the molding shaped as a sheet are that a saving of from 10 to 25% by weight of flame retardant is achieved by distributing the amounts of the flame retardant across the thickness of the sheet without any impairment of fire performance and, respectively, that if the amount of flame retardant used is the same as that for uniform distribution, fire performance is improved. Another advantage is that, using the same amount of flame retardant, it is possible to obtain many different flame retardancy profiles across the thickness of the molding, since it is possible to vary the amounts of flame retardant provided in individual layers of the molding.

Fire Test (Cone Calorimeter Test)

The test follows the standard ISO 5660 with a power setting of 50 kW and a duration of 720 s. Important test criteria are the total thermal release (THR) after various test times, the total thermal release calculated from the weight loss, and the ignition times for the decorative layer and the core layer. Thermal release here is plotted against irradiation time, and from these curves it is possible to discover the time taken for complete combustion of the decorative layer, for example, and the amount contributed by the decorative layer to thermal release during this period.

Xenon 1200 Test

This test is carried out with settings as specified in the applicant's TNO 158/89. In this internal test, a sample provided with flame retardant is irradiated by xenon lamps for 3000 hours. This corresponds to about 10 years of use under natural insolation in a climate typical of western Europe. The light sources are three xenon lamps each with a power rating of 4500 W. The light intensity is 90±5 W/m$^2$ in the wavelength range from 300 to 400 nm. The ambient temperature is 30° C., the blank panel temperature is 45±3° C., the relative humidity is 65±5%. The sample is sprayed in cycles with water for 3 min, each cycle lasting 20 min, i.e. the spray period lasting 3 min starts 17 min after the start of the cycle. The water has been distilled. The sample runs on a circuit, along the periphery of which the xenon lamps have been positioned, each at 120° to the other. A turn through 180° takes place after each traverse of the circuit by the sample, so that the two sides are irradiated in a ratio of 50/50.

The conditions which have to be complied with by flame-retardant sheets are described in detail, inter alia, in the pending U.S. patent application Ser. No. 09/878,254 filed Jun. 11, 2001. An important factor here is that the flame-retardant modification must not impair the properties of the surface.

Water Absorption and Swelling

The following two methods are used:

1. Five 50×50 mm samples are aged in boiling water for 2 hours. Weight and edge thickness (at 4 points) are measured prior to and after aging. These data are used to calculate water absorption and swelling. This test follows EN 438-2.
2. Five 50×50 mm samples are aged for 500 hours in water at 23° C. The calculation of water absorption and swelling is the same as in Method 1. This test is carried out to DIN 53495 Method 3L.

Mechanical Strength Tests

The following data are determined longitudinally on five samples on a flexing rig:

1. deflection as a ratio of the force exerted
2. the force exerted when the sample fractures.

The modulus of elasticity is calculated from the rise over a linear portion in the ratio of deflection to force exerted. The flexural strength can be determined from the force exerted when the sample fractures.

The following non-limiting examples serve to illustrate the invention. It will be appreciated that variations in proportions and alternatives in elements of the components of the invention will be apparent to those skilled in the art and are within the scope of the present invention.

The examples below show symmetrical and asymmetrical distributions of the flame retardants, whereas the comparative examples have uniform distribution of the flame retardants.

EXAMPLE 1

The thickness of the molding is 8 mm, and the core is composed of layers of phenolic-resin-impregnated kraft papers, while the decorative layers are composed of a coating curable by electron beam. The core is also enclosed by substrate layers which serve as flame-retardant barriers. The various layers have been modified with different amounts of flame retardants, and there is also a difference in the types of the flame retardants used in the individual layers. The distribution of the flame retardants is symmetrical across the thickness of the molding:

| Layer | Flame retardant | Active content of phosphorus |
|---|---|---|
| Decorative layer, frontal | Ammonium polyphosphate | 3% |
| Substrate layer, frontal | Ammonium pyrophosphate | 2.5% |
| Upper core layer | Ammonium phosphate | 2% |
| Central core layers | Ammonium phosphate | 1.2% |
| Lower core layer | Ammonium phosphate | 2% |
| Substrate layer, reverse-side | Ammonium pyrophosphate | 2.5% |
| Decorative layer, reverse-side | Ammonium polyphosphate | 3% |

The active content of phosphorus in the individual layers is symmetrical with respect to the central core layers which form the center of the thickness of the molding, and the distribution of the phosphorus corresponds to an average phosphorus content of 1.4% by weight.

EXAMPLE 2

The molding 1 has a thickness of 8 mm, and the core is composed of phenolic-resin-coated wood fibers, while a coating curable by electron beam is used for the decorative layers. The individual layers have been modified with different amounts of flame retardants, and they also comprise different types of flame retardants. The distribution of the flame retardants is asymmetrical with respect to the central core layers:

| Layer | Flame retardant | Active content of phosphorus |
|---|---|---|
| Decorative layer, frontal | Melamine polyphosphate | 4% |
| Substrate layer, frontal | Melamine pyrophosphate | 3% |
| Upper core layer | Ammonium polyphosphate | 1.6% |
| Central core layers | Ammonium phosphate | 1% |
| Lower core layer | Ammonium polyphosphate | 1% |
| Substrate layer, reverse-side | Melamine pyrophosphate | 1% |
| Decorative layer, reverse-side | Melamine polyphosphate | 2% |

The distribution of the active phosphorus of the flame retardants corresponds to an average phosphorus content of 1.2% by weight.

EXAMPLE 3

The molding 1 has a thickness of 8 mm, and the core is composed of layers of phenolic-resin-coated wood fibers, while a coating curable by electron beam is used for the decorative layers. The layers have been modified with different amounts and types of flame retardants. In this example, no flame retardant is present in the frontal or reverse-side decorative layer, while the frontal and the reverse-side substrate layer, which are barrier layers, have been provided with a relatively high content of flame retardant. The distribution of the flame retardants is symmetrical with respect to the central core layers:

| Layer | Flame retardant | Active content of phosphorus |
|---|---|---|
| Decorative layer, frontal | No flame retardant | — |
| Substrate layer (barrier) | Melamine pyrophosphate | 6% |
| Upper core layer | Ammonium pyrophosphate | 2.5% |
| Central core layers | Ammonium phosphate | 1% |
| Lower core layer | Ammonium pyrophosphate | 2.5% |
| Substrate layer (barrier) | Melamine pyrophosphate | 6% |
| Decorative layer, reverse-side | No flame retardant | —% |

The distribution of the active phosphorus corresponds to an average phosphorus content of 1.5% by weight, based on the total weight of the molding 1.

EXAMPLE 4

The molding 1 has a thickness of 8 mm, and the core is composed of phenolic-resin-impregnated layers made from kraft papers. The decorative layers are decorative papers which have been impregnated with melamine resin. The core layers have been enclosed by barrier layers. The barrier layers and the core layers have been modified with various amounts of flame retardant. The same flame retardant is used for both types of layer. The distribution of the flame retardant is symmetrical, and the distribution of the active phosphorus corresponds to an average phosphorus content of 1.6% by weight.

| Layer | Flame retardant | Active content of phosphorus |
|---|---|---|
| Decorative layer, frontal | Melamine resin | — |
| Barrier layer | Ethane diammonium phosphate | 2.5% |
| Core layers | Ethane diammonium phosphate | 1.5% |
| Barrier layer | Ethane diammonium phosphate | 2.5% |
| Decorative layer, reverse-side | Melamine resin | — |

COMPARATIVE EXAMPLES 1 TO 3

Each of the moldings has a thickness of 8 mm, and the core is composed of phenolic-resin-impregnated kraft papers, while a coating curable by electron beam is used for the decorative layers. The core has been enclosed by substrate layers, and the distribution of the flame retardants is uniform. No flame retardant has been provided in the frontal or reverse-side decorative layer. Comparative Examples 1 to 3 have an average phosphorus content of 1.2, 1.8 and 2.4% by weight.

| Layer | Flame retardant | Active content of phosphorus A | B | C |
|---|---|---|---|---|
| Decorative layer, frontal | — | — | — | — |
| Substrate layer | Ammonium pyrophosphate | 1.2% | 1.8% | 2.4% |
| Upper core layers | Ammonium pyrophosphate | 1.2% | 1.8% | 2.4% |
| Central core layers | Ammonium pyrophosphate | 1.2% | 1.8% | 2.4% |
| Lower core layers | Ammonium pyrophosphate | 1.2% | 1.8% | 2.4% |
| Substrate layer | Ammonium pyrophosphate | 1.2% | 1.8% | 2.4% |
| Decorative layer, reverse-side | — | — | — | — |

COMPARATIVE EXAMPLES 4 TO 6

The molding has a thickness of 8 mm, and its core is composed of layers of phenolic-resin-coated wood fibers. A coating curable by electron beam is used for the decorative layers. The decorative layers have not been modified with a flame retardant. The active content of phosphorus corresponds to an average phosphorus content for Comparative Examples 4 to 6 of 1.2, 1.8 and 2.4% by weight.

| Layer | Flame retardant | Active content of phosphorus A | B | C |
|---|---|---|---|---|
| Decorative layer, frontal | — | — | — | — |
| Substrate layer | Ammonium phosphate | 1.2% | 1.8% | 2.4% |
| Core layers | Ammonium phosphate | 1.2% | 1.8% | 2.4% |
| Substrate layer | Ammonium phosphate | 1.2% | 1.8% | 2.4% |
| Decorative layer, reverse-side | — | — | — | — |

TABLE 1

Fire test (Cone Calorimeter Test) to ISO 5660

| Sheet | Average phosphorus content % by weight | Total thermal release after seconds 60 MJ/m$^2$ | 80 MJ/m$^2$ | 300 MJ/m$^2$ | 720 MJ/m$^2$ | Net thermal energy MJ/kg | Ignition Decorative Seconds | Core Seconds |
|---|---|---|---|---|---|---|---|---|
| Ex. 1 | 1.4 | 0.32 | 1.68 | 3.01 | 18.36 | 4.94 | none | 410 |
| Ex. 2 | 1.2 | 0.87 | 2.66 | 4.13 | 27.64 | 5.48 | 103 | 358 |
| Ex. 3 | 1.5 | 1.34 | 1.68 | 2.78 | 20.47 | 4.72 | 32 | 420 |
| Ex. 4 | 1.6 | 0.12 | 2.08 | 6.37 | 15.26 | 4.53 | none | 425 |
| Comp. Ex. 1 | 1.2 | 3.01 | 5.6 | 10.45 | 32.09 | 5.98 | 36 | 215 |
| Comp. Ex. 2 | 1.8 | 1.61 | 3.07 | 4.58 | 28.63 | 5.42 | 70 | 304 |
| Comp. Ex. 3 | 2.4 | 1.28 | 2.16 | 4.81 | 23.13 | 4.98 | 88 | 323 |
| Comp. Ex. 4 | 1.2 | 3.91 | 4.1 | 6.21 | 33.53 | 6.04 | 49 | 235 |
| Comp. Ex. 5 | 1.8 | 3.09 | 4.43 | 7.67 | 29.26 | 5.52 | 76 | 298 |
| Comp. Ex. 6 | 2.4 | 2.88 | 3.99 | 7.05 | 24.03 | 5.16 | 85 | 318 |

Ex. = Inventive Example;
Comp. Ex. = Comparative Example

TABLE 2

Water absorption and swelling

| Sheet | Average phosphorus content % by weight | Water absorption and swelling: EN 438-2 Swelling % | EN 438-2 Water absorption % | DIN 53495 Method 3L Swelling % | DIN 53495 Method 3L Water absorption % | Mechanical strength: Modulus of elasticity, longitudinal N/m$^2$ DIN53457 | Flexural strength, longitudinal N/m$^2$ ISO178 |
|---|---|---|---|---|---|---|---|
| Ex. 1 | 1.4 | 1.82 | 0.48 | 4.88 | 2.51 | 15547 | 200 |
| Ex. 2 | 1.2 | 2.62 | 0.61 | 3.37 | 1.62 | 9701 | 152 |
| Ex. 3 | 1.5 | 2.71 | 0.62 | 3.62 | 1.72 | 9654 | 146 |
| Ex. 4 | 1.6 | 1.88 | 0.49 | 4.91 | 2.53 | 15349 | 152 |
| Comp. Ex. 1 | 1.2 | 1.88 | 0.51 | 4.91 | 2.49 | 15941 | 196 |
| Comp. Ex. 2 | 1.8 | 1.95 | 0.49 | 4.78 | 2.52 | 15238 | 198 |
| Comp. Ex. 3 | 2.4 | 1.94 | 0.52 | 4.86 | 2.59 | 15473 | 192 |
| Comp. Ex. 4 | 1.2 | 2.68 | 0.59 | 3.58 | 1.73 | 9563 | 151 |
| Comp. Ex. 5 | 1.8 | 2.65 | 0.61 | 3.78 | 1.78 | 9822 | 148 |
| Comp. Ex. 6 | 2.4 | 2.73 | 0.63 | 3.66 | 1.82 | 9476 | 146 |

Ex = Inventive Example;
Comp. Ex. = Comparative Example

From Table 1 it can be seen that Example 2, which has the same average phosphorus content as Comparative Examples 1 and 4, 1.2% by weight, gives substantially lower total thermal release than the Comparative Examples, and that ignition of both the decorative layer and the core in Example 1 takes place substantially later than in the Comparative Examples 1 to 4. Comparing Examples 1, 3, and 4 with an average phosphorus content of 1.4, 1.5, and 1.6% by weight with the Comparative Examples 3 and 6, each of which has a uniform average phosphorus content of 2.4% by weight, shows that the total thermal release which occurs in these examples is lower than in the Comparative Examples, and the ignition of the core occurs later. The invention therefore achieves an advantage in that the non-uniform distribution of the flame retardant in the moldings uses a smaller proportion by weight of the flame retardant to give a degree of flame retardancy which is the same as that given by a uniform distribution of the flame retardant with a higher proportion of the flame retardant by weight.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A sheet molding comprising a core comprising a plurality of core layers, and, one or more additional layers on one or both sides of the core, which one or more additional layers are selected from the group consisting of substrate layers, decorative layers, and clear layers, wherein at least one core layer comprises flame retardant and at least one of the additional layers comprises flame retardant, and wherein the distribution of the flame retardant across a thickness of the molding is non-uniform such that a weight percent of the flame retardant present in one or more of the additional layers which contain a flame retardant, is greater than a weight percent of flame retardant in at least one of the core layers which contains flame retardant.

2. A sheet molding as claimed in claim 1, wherein the distribution of the flame retardants across the thickness of the molding is symmetrical, the flame retardant content in the core layers being lower than in the decorative and substrate layers.

3. A sheet molding as claimed in claim 1, wherein the core layers and the additional layers of the molding comprises the same flame retardant.

4. A sheet molding as claimed in claim 1 comprising a frontal decorative layer and a reverse-side decorative layer, wherein the distribution of the flame retardants across a thickness of the molding is asymmetrical, the amount of flame retardant in the frontal decorative layer being greater than in the reverse-side decorative layer, and the amount of flame retardant in the core layers being smaller than in each of the two decorative layers.

5. A sheet molding as claimed in claim 1, wherein the individual layers of the molding comprise different flame retardants.

6. A sheet molding as claimed in claim 1, wherein the flame retardant is selected from the group consisting of melamine polyphosphates, melamine pyrophosphates, ammonium polyphosphates, ammonium (pyro)phosphates, amine (pyro)phosphates, halogenated organic compounds, borates, and hydroxides of Al, Zn, Mg, and antimony oxide.

7. A sheet molding as claimed in claim 1, which comprises a decorative layer and or a substrate layer, wherein the ratio of the amount of flame retardant in the core to the amount of flame retardant in the decorative layer and/or substrate layer is from about 1:1.5 to about 1:6.

8. A sheet molding as claimed in claim 2, wherein the thickness of the molding is from 1 to 35 mm.

9. A sheet molding as claimed in claim 6, wherein the flame retardant comprises phosphorus and the distribution, across the thickness of the molding, of the phosphorus present in the flame retardants corresponds to an average phosphorus content of from 0.5 to 2.5% by weight of phosphorus in the molding.

10. A sheet molding as claimed in claim 9, wherein the average phosphorus content in the molding is from 1.2 to 1.6% by weight.

11. A process for producing a sheet molding which comprises inserting a release layer, a clear layer, a decorative layer and/or a substrate layer, where the decorative layer comprises an amount $m_1$ of a flame retardant and the substrate layer comprises an amount $m_2 \leqq m_1$ of a flame retardant, and a prefabricated core comprising more than one core layer, where each core layer comprises an amount $m_3$ of a flame retardant, where $m_3 \leqq m_2 \leqq m_1$, and inserting another substrate layer and/or a decorative layer, each of which has been provided with a flame retardant, and a clear layer, and a release layer, into an open press, and hot pressing, under pressure, all of the layers present in the press, whereupon the layers comprise resins and are cured, the resins of the layers liquefy, and the layers are molded to give a massive homogeneous molding.

12. The process as claimed in claim 11, wherein each of the decorative layer and/or substrate layer is provided with an amount $m_1$ and, respectively, $m_2$ of the flame retardant, where $m_3 \leqq m_2 \leqq m_1$.

13. The process as claimed in claim 11, wherein each of the decorative layer and/or substrate layer is modified with an amount $m_4$ and, respectively, $m_5$ of flame retardant, where $m_3 \leqq m_5 \leqq m_4$ and $m_5 < m_2$ and $m_4 < m_1$.

14. The process as claimed in claim 11 , wherein each of the decorative layers, substrate layers, and core layers comprises the same flame retardant.

15. The process as claimed in claim 11, wherein each of the decorative layers, substrate layers, and core layers is provided with a different flame retardant.

16. A sheet molding which comprises:

a) a core comprising more than one core layer, which core has a front surface and a rear surface;

b) a front substrate layer attached to the front surface of the core, and a rear substrate layer attached to the rear surface of the core;

c) a front decorative layer attached to the front substrate layer, and a rear decorative layer attached to the rear substrate layer; and d) a front clear layer attached to the front decorative layer, and a rear clear layer attached to the rear decorative layer;

wherein at least one flame retardant material is present in at least one of the core layers, and wherein at least one flame retardant material is present in at least one of the substrate layers, decorative layers, and clear layers, and wherein the distribution of the flame retardant material across the thickness of the molding is non-uniform such that a weight percent of the flame retardant material present in one or more of the substrate layers, decorative layers, and clear layers which contain a flame retardant material, by weight of the substrate layer, decorative layer, or clear layer, is greater than a weight percent of flame retardant material in at least one of the core layers which contains flame retardant material, by weight of the core layer.

17. The sheet molding of claim 16 wherein the core, the substrate layers, the decorative layers, and the clear layers each comprise a different amount of flame retardant material.

18. The sheet molding of claim 16, wherein the amounts of flame retardant material present in the clear layers are greater than the amount of flame retardant material present in the core.

19. The sheet molding of claim 16, wherein the distribution of flame retardant material across the thickness of the molding is symmetrical from the core to the layers to the front and rear of the core, and wherein the amount of flame retardant material in the core layers is less than the amount of flame retardant material in the decorative layers and substrate layers.

20. The sheet molding of claim 16, wherein each layer of the molding comprises the same flame retardant material.

21. The sheet molding of claim 16, wherein the distribution of the flame retardant material across the thickness of the molding is asymmetrical from the core to the layers to the front and rear of the core, the amount of flame retardant material in the front decorative layer is greater than in the amount of flame retardant material in the rear decorative layer, and the amount of flame retardant material in the core is less than the amount of flame retardant material in each of the front and rear decorative layers.

22. The sheet molding of claim 16, wherein each layer of the molding comprises a different flame retardant material.

23. The sheet molding of claim 16, wherein the flame retardant material is selected from the group consisting of melamine polyphosphates, melamine pyrophosphates, ammonium polyphosphates, ammonium (pyro)phosphates, amine (pyro)phosphates, halogenated organic compounds, borates, and hydroxides of Al, Zn, Mg, and antimony oxide.

24. The sheet molding of claim 16, wherein the ratio of the amount of flame retardant material in the core to the amount of flame retardant material in each of the front decorative layer, the rear decorative layer, the front substrate layer, and/or the rear substrate layer ranges from about 1:1.5 to about 1:6.

25. The sheet molding of claim 23, wherein the thickness of the molding ranges from about 1 to about 35 mm.

26. The sheet molding of claim 25, wherein the flame retardant material comprises phosphorus and the distribution of phosphorus in the flame retardant material across the thickness of the molding comprises an average phosphorus content of from about 0.5 to about 2.5% by weight of the molding.

27. The sheet molding of claim 26, wherein the average phosphorus content in the molding ranges from about 1.2 to about 1.6% by weight of the molding.

28. A process for producing a sheet molding which process comprises:

a) providing an open heat press;

b) inserting a plurality of pre-molding layers into the open press, which pre-molding layers comprise, in order, a front release layer, a front clear layer, a front decorative layer, a front substrate layer, a prefabricated core said core comprising more than one at least one core layer, a rear substrate layer, a rear decorative layer, a rear clear layer, and a rear release layer, wherein the front decorative layer comprises an amount $m_1$ of a flame retardant, the front substrate layer comprises an amount $m_2$ of a flame retardant material, wherein $m_2 \leqq m_1$, and wherein at least one core layer comprises a flame retardant material which is present in an amount $m_3$, wherein $m_3 \leqq m_2 \leqq m_1$, and wherein the rear substrate layer and the rear decorative layer each comprises a flame retardant material;

b) hot pressing, under pressure, all of the pre-molding layers present in the press, such that the prefabricated core becomes cured, any resins of the pre-molding layers liquefy, and the pre-molding layers are molded to the core to thereby form a sheet molding.

29. The process of claim 28, wherein the rear decorative layer and/or the rear substrate layer comprises an amount $m_1$ and $m_2$, respectively, of flame retardant material, where $m_3 \leqq m_2 \leqq m_1$.

30. The process of claim 28, wherein each of the rear decorative layer and/or the rear substrate layer comprises an amount $m_4$ and $m_5$, respectively, of flame retardant material where $m_3 \leqq m_5 \leqq m_4$ and $m_5 < m_2$ and $m_4 < m_1$.

31. The process of claim 28, wherein each of the decorative layers, substrate layers, and core layers comprise the same flame retardant material.

32. The process of claim 28, wherein each of the decorative layers, substrate layers, and core layers comprise different flame retardant materials.

* * * * *